US010778723B2

(12) United States Patent
Yang (10) Patent No.: US 10,778,723 B2
(45) Date of Patent: Sep. 15, 2020

(54) DEVICE VISIBILITY AND SCANNING INCLUDING NETWORK SEGMENTS

(71) Applicant: FORESCOUT TECHNOLOGIES, INC., San Jose, CA (US)

(72) Inventor: Siying Yang, Cupertino, CA (US)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 313 days.

(21) Appl. No.: 15/936,180

(22) Filed: Mar. 26, 2018

(65) Prior Publication Data

US 2019/0297113 A1 Sep. 26, 2019

(51) Int. Cl.
*H04L 29/06* (2006.01)
*H04L 12/813* (2013.01)
*H04L 29/12* (2006.01)
*H04L 12/24* (2006.01)

(52) U.S. Cl.
CPC .......... *H04L 63/20* (2013.01); *H04L 41/0213* (2013.01); *H04L 47/20* (2013.01); *H04L 61/256* (2013.01); *H04L 63/029* (2013.01); *H04L 63/1408* (2013.01); *H04L 63/1433* (2013.01); *H04L 63/1466* (2013.01); *H04L 61/2514* (2013.01); *H04L 61/2535* (2013.01)

(58) Field of Classification Search
CPC ... H04L 63/20; H04L 63/029; H04L 63/1408; H04L 63/1466; H04L 47/20; H04L 63/1433; H04L 61/256; H04L 41/0213; H04L 61/2535; H04L 61/2514
See application file for complete search history.

(56) References Cited

U.S. PATENT DOCUMENTS

| 8,145,733 | B1 * | 3/2012 | Cheng | H04L 61/2514 709/220 |
| 8,281,377 | B1 * | 10/2012 | Snow | H04N 21/41407 726/7 |
| 8,701,179 | B1 * | 4/2014 | Penno | H04L 63/02 709/227 |
| 9,178,846 | B1 * | 11/2015 | Kamisetty | H04L 63/02 |
| 2008/0235358 | A1 * | 9/2008 | Moribe | H04L 12/2832 709/220 |
| 2012/0255019 | A1 | 10/2012 | McNamee et al. | |
| 2016/0337244 | A1 * | 11/2016 | Baveja | H04L 67/1002 |
| 2017/0310699 | A1 * | 10/2017 | Gilbert | H04L 63/1433 |
| 2018/0309786 | A1 * | 10/2018 | Apelewicz | H04W 12/04 |

FOREIGN PATENT DOCUMENTS

EP  1814257 A1  8/2007

OTHER PUBLICATIONS

Int'l Search Report and Written Opinion of the ISA/EP in PCT/US2019/021915 dated Jun. 17, 2019; 9 pgs.
Sivaraman et al., "Smart-Phones Attacking Smart-Homes", Security and Privacy in Wireless and Mobile Networks, Acm, Jul. 18, 2016, pp_ 195-200_.

* cited by examiner

*Primary Examiner* — Michael R Vaughan
(74) *Attorney, Agent, or Firm* — Womble Bond Dickinson (US) LLP (57) ABSTRACT

Systems, methods, and related technologies for device scanning are described. In certain aspects, a device is selected based on being a NAT device and information is accessed therefrom to determine a device communicatively coupled to the NAT device. The device communicatively coupled to the NAT device may then be scanned and the results stored.

21 Claims, 6 Drawing Sheets

DEVICE VISIBILITY AND SCANNING INCLUDING NETWORK SEGMENTS

TECHNICAL FIELD

Aspects and implementations of the present disclosure relate to device scanning, and more specifically, scanning the devices among one or more network segments of a communication network.

BACKGROUND

As technology advances, the number and variety of devices that are connected to communications networks are rapidly increasing. Each device may have its own respective vulnerabilities which may leave the network open to compromise or other risks. Scanning of each device on a network can be useful for monitoring or securing a communication network in order to prevent unauthorized or rogue devices from accessing network resources.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to device visibility and scanning across one or more network segments. The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras, wearable devices, medical devices, etc.) can make it difficult to effectively ensure that network security is maintained. Accordingly, described herein in various implementations are systems, methods, techniques, and related technologies, which enable the ongoing scanning of segmented networks for devices so that the devices can be monitored for vulnerabilities and other actions taken.

Network segmentation can be used to enforce security policies on a network, for instance in large and medium organizations. Firewalls may be used to segment a network and use different address subnets for each segment. Some of the subnets may have private internet protocol (IP) addresses (e.g., as defined in RFC 1918 or RFC 4193). The firewalls perform network address translation (NAT) between public and private IP addresses. In some segments, the same private IP addresses may overlap with another network segment. One of the problems NAT originally solved was the problem of there not being enough IPv4 addresses. NAT was originally used for translation between public IP addresses and private IP addresses but increasingly it is being used to hide network details from outside the network.

As a result of the design of NAT, a device outside, or on one side, of a NAT device will only see an exterior or public IP address of the NAT device and is unable to reach a particular device behind, or on the other side, of the NAT device. The device outside the NAT device will only be able to see the exterior address (e.g., public IP address) of the NAT device. The device behind the NAT device may have a private IP address, however, public IP addresses may be used as well.

This same situation applies when a network is segmented where devices outside a NAT device are not able to communicate with devices behind the NAT device. For example, a network access control (NAC) device coupled to a firewall will have difficulty recognizing a device behind the firewall due to NAT. If two devices behind a firewall have IP addresses of 192.168.1.1 and 192.168.1.2 and the firewall has an exterior or public IP address of 100.100.1.10, the NAC device will see traffic from the two devices behind the firewall as having an IP address of 100.100.1.10 instead of 192.168.1.1 or 192.168.1.2 because of NAT. Network segmentation thus poses deployment challenges for network access control (NAC) devices and other centralized device or endpoint management products because traditional methodologies are not able to reach endpoints in different network segments and are unable to track devices with overlapping IP addresses. While it may be possible to deploy a NAC device in each network segment, this is not practical or cost effective. Further, there will be challenges in enabling each of the NAC devices to communicate with each other across each of the network segments.

Embodiments utilize a collaborative endpoint or device management approach. Embodiments communicate with the network address translation (NAT) device (e.g., firewall) so a device (e.g., a NAC device) outside of a private IP address segment can obtain visibility of the devices with private IP address (e.g., behind a NAT device). Embodiments may use an application programming interface (API) or a command line interface (CLI), simple network management protocol (SNMP) interface, etc., to poll real-time network session information and use a network segment identifier to uniquely identify each device behind the NAT device and overcome the problem of overlapping IP addresses (e.g., multiple segments using a single private IP address range).

Embodiments are operable to access or retrieve network session information (e.g., periodically) from a NAT device. This network session information includes information about the devices behind the NAT device including each IP address. Network session information may be stored as a table and may include metadata for each active network session. For a session with NAT enabled, the session information can include the original IP address and port information (e.g., private IP address) and the translated information (e.g., translated IP address and translated port information, for instance translated source port information). A flag may indicate that a session is a NAT session. It is appreciated that one or more sessions may not have a translated IP address, in some embodiments, the sessions that have translated addresses are used for scanning and other functions (e.g., classification, identification, remediation, etc.).

For example, an example session table entry may be: 192.168.1.100:32767⇒216.58.168.110:80 [TCP], translated, 215.10.20.89:52767⇒216.58.198.110:80 [TCP], where a device with a private IP address of 192.168.1.100 starts a TCP session, trying to connect to TCP port 80 of a public IP address of 216.58.198.110. The NAT device (e.g., a firewall) translates the private IP address (e.g., 192.168.1.100) into one of its public IP addresses from its NAT pool (e.g., 215.10.20.89). It also translates the original port number 32767 to 52767. The network session information can then be used to identify a device behind the NAT device and a unique identifier can be assigned to the device behind the NAT device. For example, the device with an IP address of 192.168.1.100 may be identified based on the network session information and a unique identifier for the device being 215.10.20.89-192.168.1.100 (e.g., NAT device—private IP address format). Embodiments are thus able to uniquely identify one or more devices behind a NAT device. It is appreciated that non-unique identifiers may be used (e.g., an identifier that is unique to a specific network segment may match an identifier used for another network segment).

Using the uniquely identified one or more devices behind the NAT device, embodiments are operable to configure the NAT device to allow communication through the NAT device to a device behind the NAT device. A port forwarding policy may be configured on the NAT device to allow queries and communication with devices behind the NAT device. For example, if the NAT device is a firewall, a port forwarding policy or a port forwarding rule may be dynamically configured on the firewall to allow communication with a device behind the NAT device (e.g., communication by a NAC device to a device behind the firewall). Embodiments may dynamically create port forwarding policies on the NAT device. For example, port forwarding policies may be removed after a particular device behind the NAT device has been queried, scanned, or actions taken based on the scan. Embodiments further support visibility and scanning of devices in a cloud or other remote network environment.

Figure 1:
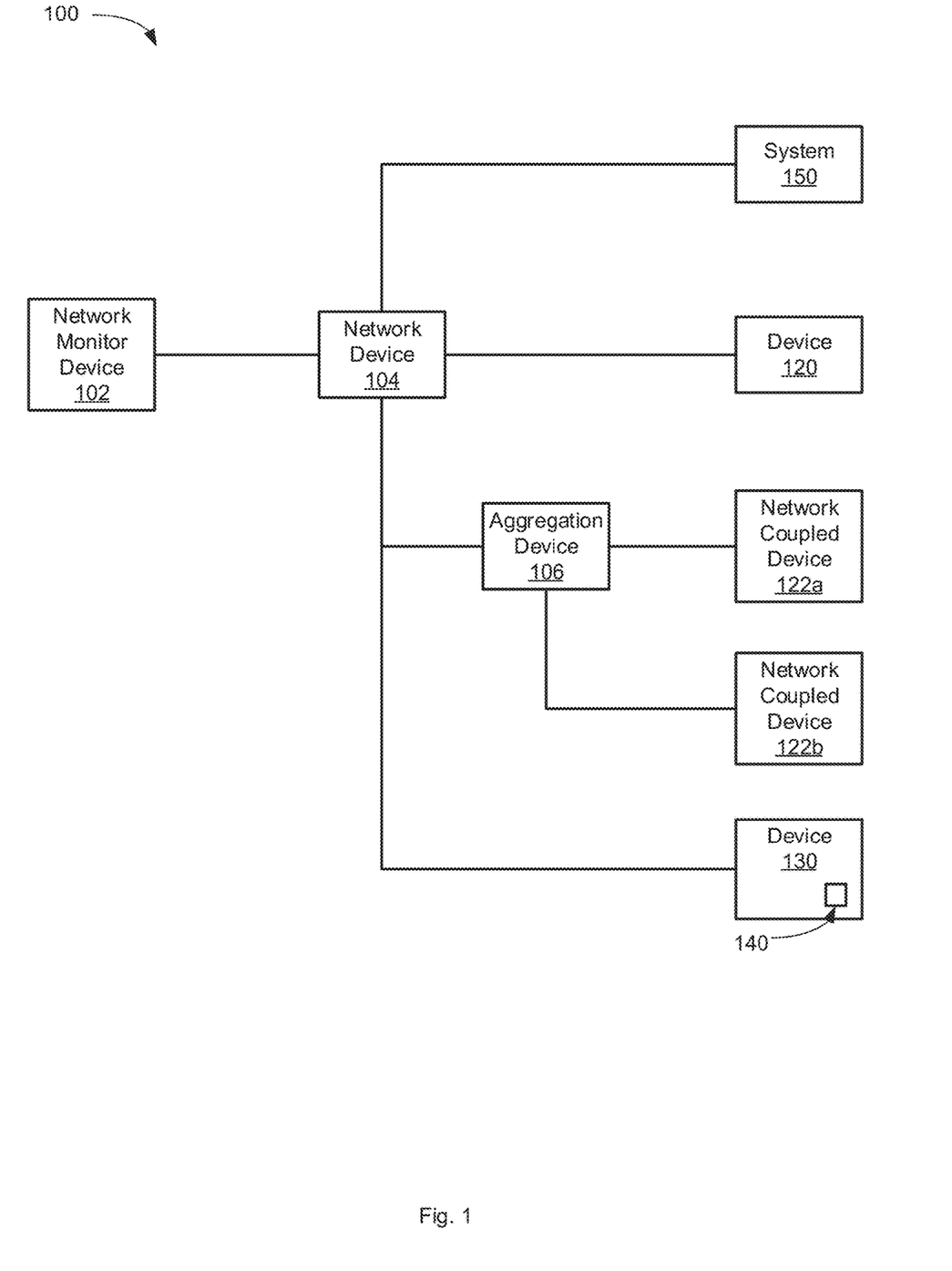
FIG. 1 depicts an illustrative communication network in accordance with one implementation of the present disclosure.

Embodiments may work with any of a variety of NAT devices including a router, a firewall, a switch, an access point, a hub, etc. Embodiments may include a variety of devices including a NAC device, a router, a switch, access point, a hub, a vulnerability assessment (VA) system, a threat detection (TD) system, an advanced threat detection (ATD), and a mobile device management (MDM) system. Embodiments can also include devices that are external to a network (e.g., external to network 100).

Embodiments support multiple levels of NAT, e.g., where multiple firewalls or NAT devices are involved. For example, a first private IP address may be translated by a first NAT device to a second private IP address and the second private IP address may then be translated to a third private IP address or a public IP address (e.g., in a service provider environment) by a second NAT device. Embodiments can thus work with devices performing carrier grade network address translation (CGNAT).

Accordingly, described herein in various implementations are systems, methods, techniques, and related technologies, which enable device visibility, scanning, and remediation. As described herein, various techniques can be used to scan devices behind a NAT device.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122*a-b*. The devices 120 and 130 and network coupled devices 122*a-b* may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122*a-b*. Network device 104 may be one or more network switches, access points, routers, firewalls, hubs, etc.

Network monitor device 102 may be operable for a variety of tasks including determining one or more devices behind a NAT device (e.g., firewall, router, switch, etc.), determining a unique identifier for each device behind the NAT device, configuring the NAT device (e.g., with a port forwarding policy) to enable communication with at least one device behind the NAT device, and performing a scan of the at least one device behind the NAT device. Network monitor device 102 may further configure the NAT device to disable communication with the at least one device behind the NAT device (e.g., after the scan and any actions are performed) by removing the configuration changes.

Network monitor device 102 may further perform a variety of functions including identification, classification, and taking one or more remediation actions (e.g., changing network access of the device behind the NAT device, change the virtual local area network (VLAN), send an email, short message service (SMS), etc.) based on the results of the scan. For example, if the device behind the NAT device is determined to have a vulnerability or be an improper device, the NAT device may be configured to block communications from the device behind the NAT device.

In some embodiments, network monitor device 102 may identify a device as a NAT device based on monitoring traffic and performing classification or identification of devices on a network. In various embodiments, network monitor device 102 may receive input (e.g., user input) of information about a NAT device. For example, a user could enter the IP address of a firewall device.

Network monitor device 102 may periodically communicate with a NAT device to access network session information (e.g., a network session table). In some embodiments, a portion of the network session information is retrieved or accessed from the NAT device. For example, the network session information for translated sessions may be retrieved or accessed. As another example, a differential of the network session information (e.g., since a particular time or entries of a translated sessions) may be retrieved or access. An API or a CLI may be used to access the network session information.

Network monitor device 102 can determine address information (e.g., private or public IP address) of one or more devices behind the NAT device using the network session information. This enables network monitor device 102 to thus gain visibility to devices that are behind the NAT device.

Network monitor device 102 can use information from the network session information to classify or identify the operating system of a device behind a NAT device. In some embodiments, network monitor device 102 can use a TCP sequence number, header information and other protocol level information from the network session information to determine the operating system of a device behind the NAT device. In various embodiments, behavior based analysis may further be used to identify the operating system.

Network monitor device 102 further supports determining device or endpoint identifiers in situations where network segments have overlapping IP addresses. In a cases where a first device behind a first NAT device has a private IP address and a second device behind a second NAT device has the same IP address or is in the same IP address range, the identifier used to uniquely identify the first and second device may include the respective NAT device's public IP address, the NAT device's network interface MAC address that is communicatively coupled to a particular subnet (or segment), and the IP address of the device (e.g., the device's private IP address). For example, for a firewall with a public IP address of 100.100.3.30, a subnet or segment interface with a MAC address of 9A:8B:25:65:99:87, and a device behind the firewall with a private IP 10.10.10.126, the unique identifier of the device behind the firewall is 100.100.3.30-9A:8B:25:65:99:87-10.10.10.126. Embodiments further support using other unique properties of the NAT device in place of the MAC address of the subnet or segment interface of the NAT device (e.g., the exterior or public IP of the NAT device, a tenant identifier, zone identifier, etc.). The information (e.g., MAC address, tenant identifier, etc.) can be accessed from the network session information, via an API, or via a CLI.

Network monitor device 102 may further support device visibility and scanning where multiple levels of NAT are performed. Multiple levels of NAT may be present when there is a NAT device behind another NAT device. For example, when there is a network segment behind a firewall that performs NAT and that network segment includes another firewall performing NAT that forms another network segment. Network monitor device 102 thus supports carrier grade NAT (CGNAT), where network translation happens more than once. Network monitor device 102 may get network session information from a first NAT device, configure a first port forwarding policy on the first NAT device to communicate with a second NAT device, and get network session information from the second NAT device. Network monitor 102 can then configure a second port forwarding policy on the second NAT device to communicate with or scan the one or more devices behind the second NAT device. It is appreciated that the first port forwarding policy on the first NAT device may be used to communicate with or scan the one or more devices behind the first NAT device (e.g., computing systems and other devices that are not performing NAT) as well. The first and second port forwarding policies may be removed from the first and second NAT devices after the identification and scanning of the devices behind the first and second NAT devices have been completed. It is appreciated that embodiments support any number of levels of NAT.

In some embodiments, network monitor device 102 comprises a remotely executable software module (e.g., script, binary, etc.) that can be installed or executed on a NAT device (e.g., a firewall, a router, etc.). The software module when installed or executed on the NAT device will access the network session information of the NAT device, determine unique identifiers, optionally determine the operating system of the devices behind the NAT device, as described herein, and provide the information about the devices behind the NAT device to network monitor device 102. The software module may further perform a scan of the devices behind the NAT device, as described herein, and send the results of the scan to network monitor device 102. The software module may thus allow the scanning of devices behind the NAT device without configuration of a port forwarding policy.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor communication using a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of devices by network monitor device 102 may be based on a combination of one or more pieces of information including traffic analysis, information from external or remote systems (e.g., system 150), communication (e.g., querying) with an aggregation device (e.g., aggregation device 106), and querying the device itself (e.g., via an API, CLI, or web interface), which are described further herein. Network monitor device 102 may be operable to use one or more APIs to communicate with aggregation device 106, device 120, device 130, or system 150. Network monitor device 102 may monitor for or scan for devices that are communicatively coupled to a network via a NAT device (e.g., firewall, router, etc.) dynamically, periodically, or a combination thereof.

Information from one or more external or $3^{rd}$ party systems (e.g., system 150) may further be used in conjunction with the information received from a NAT device. For example, a vulnerability assessment (VA) system may be queried to verify or check a determination of one or more devices behind a NAT device. External or $3^{rd}$ party systems may also be used to perform a scan or a check on a device to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many devices may not be possible, e.g., IoT or smart devices.

System 150 may be one or more external, remote, or third party systems (e.g., separate) from network monitor device 102 and may have information about devices 120 and 130 and network coupled devices 122a-b. System 150 may include a vulnerability assessment (VA) system, a threat detection (TD) system, a mobile device management (MDM) system, a firewall (FW) system, a switch system, an access point system, etc. Network monitor device 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor device 102.

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 104 or aggregation device 106) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor device 102 which may be used to monitor devices and control network access of one or more devices. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of a device being monitored in real-time which can then be used to determine a risk level of the device.

Aggregation device 106 may be configured to communicate with network coupled devices 122a-b and provide network access to network coupled devices 122a-b. Aggregation device 106 may further be configured to provide information (e.g., operating system, device software information, device software versions, device names, application present, running, or both, vulnerabilities, patch level, etc.) to network monitor device 102 about the network coupled devices 122a-b. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor device 102. It is appreciated that log information may be particularly reliable for stable network environments (e.g., where the types of devices on the network do not change often). The log information may include information of updates of software of network coupled devices 122a-b.

Figure 2:
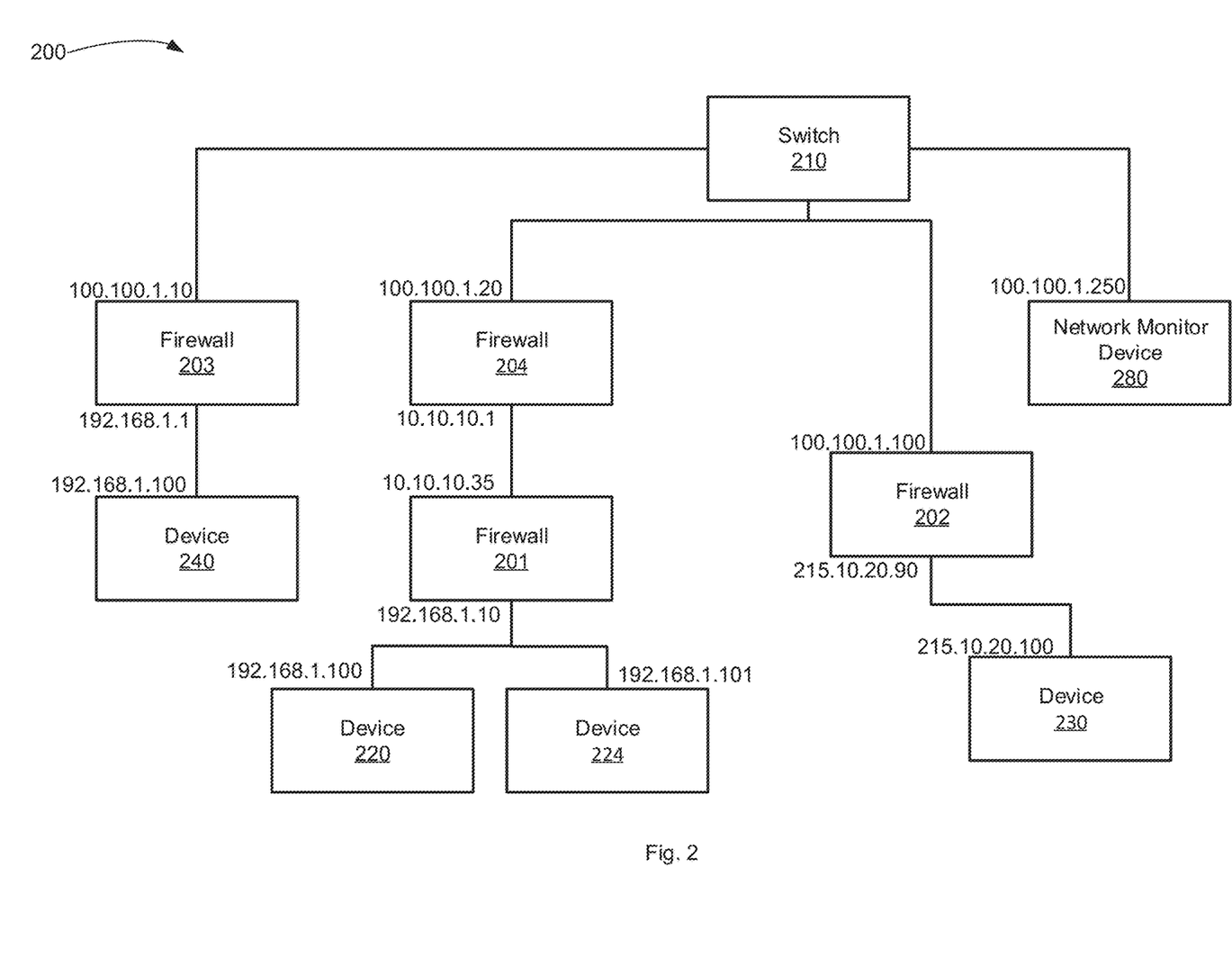
FIG. 2 depicts an illustrative network topology in accordance with one implementation of the present disclosure.

FIG. 2 depicts an illustrative network topology in accordance with one implementation of the present disclosure. FIG. 2 depicts an example network 200 with a variety of address configurations in which a network monitor device (e.g., network monitor device 102) may determine and scan devices behind one or more NAT devices. FIG. 2 show example network devices 220-240 and it is appreciated that more or fewer network devices or other network devices may be used in place of network devices of FIG. 2. For example, firewalls 201-204 may be any device that performs NAT. Network monitor device 280 may be any of a variety of network devices, e.g., router, firewall, an access point, network access control (NAC) device, intrusion prevention system (IPS), intrusion detection system (IDS), deception device, cloud-based device, virtual machine based system, etc. Network monitor device 280 may be substantially similar network monitor device 102. The IP addresses shown in FIG. 2 are examples, and embodiments support private IP addresses in place of public IP addresses and vice versa. Embodiments also support IPv4, IPv6, and other addressing schemes.

Switch 210 communicatively couples the devices of network 200 including firewalls 202-204 and network monitor device 280. Firewalls 201-204 perform NAT and communicatively couple the devices 220-240 which are behind the firewalls. Firewall 201 has an internal interface with an IP address of 192.168.1.10 and an external interface with an IP address of 10.10.10.35. Firewall 202 has an internal interface with an IP address of 215.10.20.90 and an external interface with an IP address of 100.100.1.100. Firewall 203 has an internal interface with an IP address of 192.168.1.1 and an external interface with an IP address of 100.100.1.10. Firewall 204 has an internal interface with an IP address of 10.10.10.1 and an external interface with an IP address of 100.100.1.20.

Device 240 has an IP address of 192.168.1.100. Device 220 has an IP address of 192.168.1.100. Device 224 has an IP address of 192.168.1.101. Device 230 has an IP address of 215.10.20.100. Network monitor device 280 has an IP address of 100.100.1.250.

Network monitor device 280 is configured to identify devices on network 200 and scan the devices, as described herein. Network monitor device 280 may further take actions based on the scan of devices of network 200, as described herein.

Network monitor device 280 selects firewall 203 to determine devices that are behind firewall 203, as described herein. Network monitor device 280 requests or accesses network session information from firewall 203. Network monitor device 280 determines that device 240 is communicatively coupled to firewall 203 based on the network session information and determines a unique identifier for device 240, as described herein. Network monitor device 280 then configures a port forwarding policy on firewall 203 to allow network monitor device 280 to communicate with or scan device 240. When the scan requests are sent to firewall 203, firewall 203 sends the requests to device 240 according to the port forwarding policy. The port forwarding policy thus allows network monitor device 280 to communicate with device 240 which has a private IP address and is on a different segment. Once network monitor device 280 has completed its scan of device 240, it may remove the port forwarding policy that was configured on firewall 203 or reconfigure the port forwarding policy if there is another device (not shown) behind firewall 203.

Network monitor device 280 selects firewall 204 to determine devices that are behind firewall 204, as described herein. Network monitor device 280 requests or accesses network session information from firewall 204. Network monitor device 280 may determines that firewall 201 is behind firewall 204 based on the network session information and determines a unique identifier for firewall 201, as described herein. In some embodiments, network device monitor 280 may have determined heuristically or based on user input that firewall 201 was behind firewall 204. Network monitor device 280 then configures a port forwarding policy on firewall 204 to allow network monitor device 280 to communicate with firewall 201. Network device monitor 280 requests or accesses network session information from firewall 201. The port forwarding policy thus allows network monitor device 280 to communicate with firewall 201 which has a private IP address and is on a different segment.

Network monitor device 280 determines that devices 220-224 are communicatively coupled to firewall 201 based on the network session information and determines a unique identifier for each of device 220-224, as described herein. Network monitor device 280 then configures a port forwarding policy on firewall 201 to allow network monitor device 280 to scan device 220. When the scan requests are sent to firewall 204, the requests are sent to firewall 201 and firewall 201 sends the requests to device 220 according to the port forwarding policy. The port forwarding policy thus allows network monitor device 280 to communicate with device 220 which has a private IP address, is on a different segment, and behind multiple NAT devices (e.g., firewall 204 and firewall 201). Once network monitor device 280 has completed its scan of device 220, it may remove the port forwarding policy that was configured on firewall 201 or reconfigure the port forwarding policy to allow a scan of device 224. Once network monitor device 280 has completed its scan of device 224, it may remove the port forwarding policy that was configured on firewall 201 or reconfigure the port forwarding policy to scan another device (not shown). It is appreciated that the IP address range of the segment behind firewall 201 overlaps with the IP address range of the segment behind firewall 203. Embodiments further support configuring respective port forwarding policies to allow communication of device 220 and device 224 in parallel. It is also appreciated that device 240 and device 220 have the same IP address of 192.168.1.100.

Network monitor device 280 selects firewall 202 to determine devices that are behind firewall 202, as described herein. Network monitor device 280 requests or accesses network session information from firewall 202. Network monitor device 280 determines that device 230 is communicatively coupled to firewall 202 based on the network session information and determines a unique identifier for device 240, as described herein. Network monitor device 280 then configures a port forwarding policy on firewall 202 to allow network monitor device 280 to scan device 230. When the scan requests are sent to firewall 202, firewall 202 sends the requests to device 230 according to the port forwarding policy. The port forwarding policy thus allows network monitor device 280 to communicate with device 240 which has a public IP address and is on a different segment. Once network monitor device 280 has completed its scan of device 230, it may remove the port forwarding policy that was configured on firewall 202 or reconfigure the port forwarding policy if there is another device (not shown) behind firewall 202.

Figure 3:
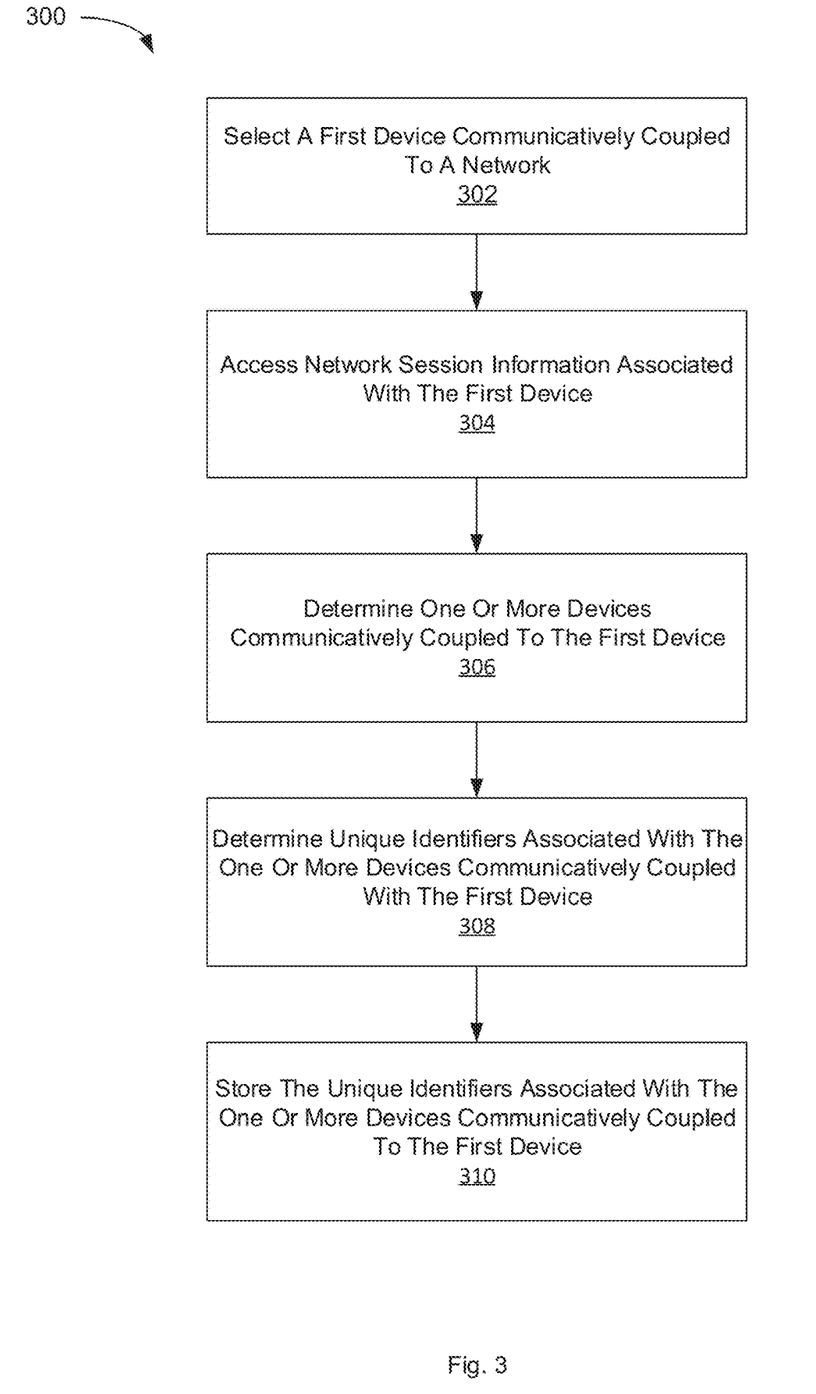
FIG. 3 depicts a flow diagram of aspects of a method for determining one or more devices behind a device performing address translation in accordance with one implementation of the present disclosure.
Figure 4:
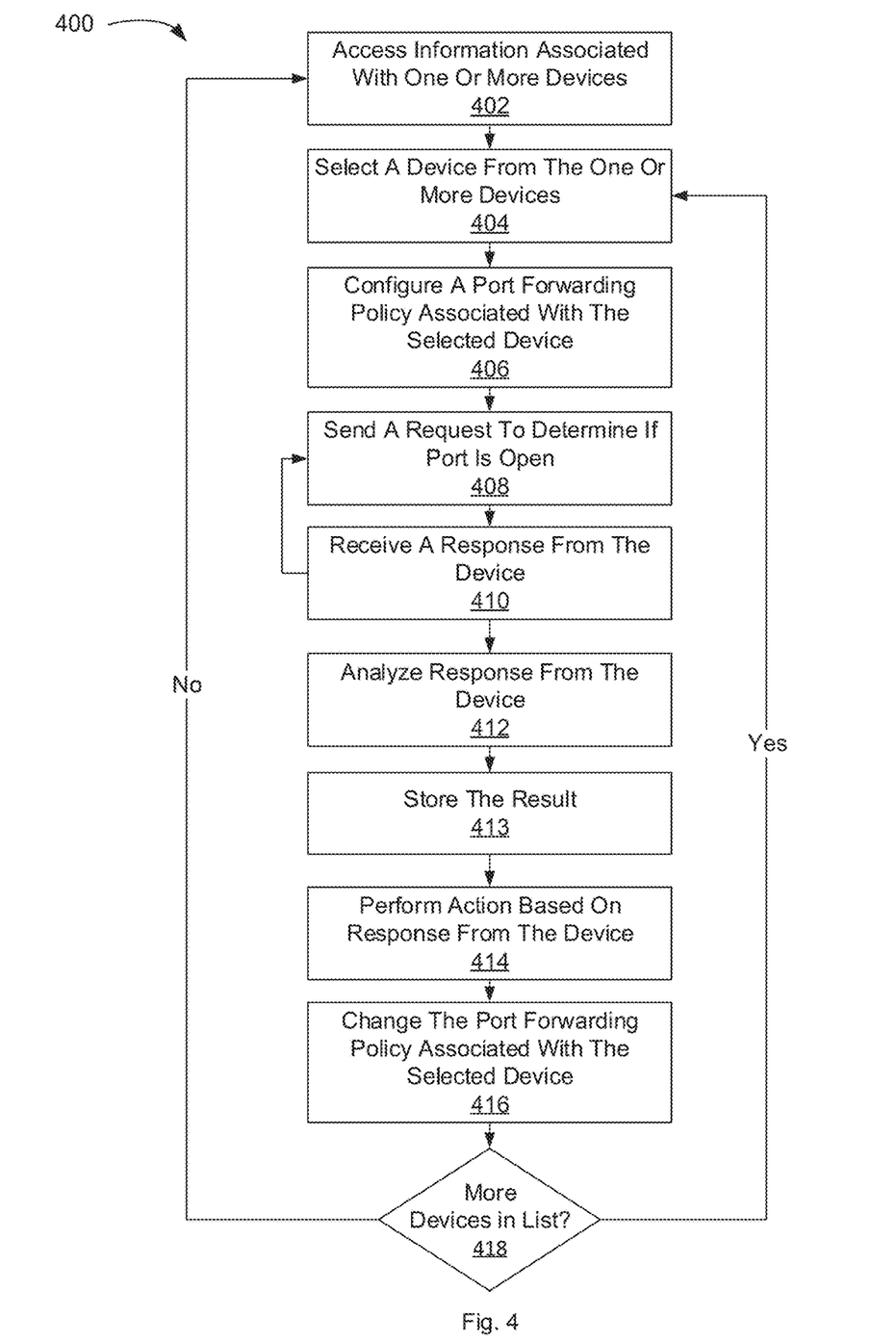
FIG. 4 depicts a flow diagram of aspects of a method for scanning one or more devices behind a device performing address translation in accordance with one implementation of the present disclosure.

With reference to FIGS. 3-4, flowcharts 300-400 illustrate example functions used by various embodiments. Although specific function blocks ("blocks") are disclosed in flowcharts 300-400, such blocks are examples. That is, embodiments are well suited to performing various other blocks or variations of the blocks recited in flowcharts 300-400. It is appreciated that the blocks in flowcharts 300-400 may be performed in an order different than presented, and that not all of the blocks in flowcharts 300-400 may be performed.

FIG. 3 depicts a flow diagram of aspects of a method for determining one or more devices behind a device performing address translation in accordance with one implementation of the present disclosure. Various portions of flowchart 300 may be performed by different components (e.g., components of system 500) of a device (e.g., network monitor device 102). Flowchart 300 depicts a process for determining one or more devices behind a NAT device (e.g., behind a firewall or a router).

At block 302, a first device communicatively coupled to a network is selected. The first device may be selected based on being a device performing NAT (e.g., a firewall, a router, an access point, etc.). The first device may also be selected based on user input that a device performs NAT or supports NAT. For example, a user may enter the IP addresses of the firewalls and routers on a network. In some embodiments, the first device may be identified or classified based on a heuristic analysis of traffic coming from the first device. In various embodiments, heuristics may also be used to determine how many devices are behind the first device.

At block 304, network session information associated with the first device is accessed. The network session information may be accessed by querying (e.g., via an API or CLI) the first device for the network session information. The network session information may include one or more IP addresses of one or more devices communicatively coupled to the first device and that at least partially communicate though the first device (e.g., to communicate with the Internet or a network external to the location of a device behind the first device). In some embodiments, a portion of the network session information that includes translated IP addresses or translation indicators (e.g., a translation flag) is accessed.

At block 306, one or more devices communicatively coupled to the first device are determined. The one or more devices communicatively coupled to first device are determined based on the network session information. The one or more devices may be determined by identifying IP addresses (e.g., private IP addresses) that are being translated by the first device.

At block 308, unique identifiers are determined for the one or more devices communicatively coupled with the first device. As described herein, the unique identifier of a device can include the device's IP address (e.g., private IP address), an external interface IP address (e.g., public IP address) of the first device (e.g., NAT device), an interface IP address or MAC address for the particular segment of the first device (e.g., a private IP address of a network interface of the NAT device), or a combination thereof.

At block 310, the unique identifiers of the one or more devices communicatively coupled to the first device are stored. The unique identifiers of the one or more devices may be stored to be used for scanning or monitoring of a network (e.g., flowchart 400), identification, classification, etc. The one or more devices may be visually depicted in a graphical user interface (GUI) based on having been identified. If there are more NAT devices on the network, another NAT device may be selected in block 302 and other blocks of flowchart 300 performed.

FIG. 4 depicts a flow diagram of aspects of a method for scanning one or more devices behind a device performing address translation in accordance with one implementation of the present disclosure. Various portions of flowchart 400 may be performed by different components (e.g., components of system 500) of a device (e.g., network monitor device 102). Flowchart 400 depicts a process for scanning one or more devices behind a NAT device (e.g., behind a firewall or a router).

At block 402, information associated with one or more devices is accessed. The information may include one or more devices that are behind one or more NAT devices and unique identifiers (e.g., determined based the blocks of flowchart 300) which are based on the network session information. The information may have been determined based on network session information from a NAT device (e.g., flowchart 300).

At block 404, a device is selected from the one or more devices. The device may be selected based on being behind a NAT device. The device may be selected to have a scan or other analysis performed thereon.

At block 406, a port forwarding policy associated with the selected device is configured. The configured port forwarding policy allows the NAT device to translate destination IP address and port number of an incoming request to a different IP address and port of the device to be scanned. The port forwarding policy may include one or more rules for the NAT device to allow communication with the device behind the NAT device. In some embodiments, the port forwarding policy may be configured dynamically (e.g., via an API or CLI). The port forwarding policy may send particular traffic sent to the NAT device to a device behind the NAT device. For example, if a firewall has an external or public IP address of 215.10.20.89 and a device behind the firewall has an IP address of 192.168.1.100, after the port forwarding policy has been configured, communications sent to the firewall at 215.10.20.89 on port 90 can be sent to 192.168.1.100. The port forwarding policy may be configured to allow serial scanning or analysis of each device behind the NAT device. For example, serial scanning may involve set a port forwarding policy to communicate with a first device behind a NAT device, communicating with that device, and removing the port forwarding policy. For the next device behind the NAT device, another port forwarding policy is set to communicate with the device behind the NAT device, communicating with that device, and removing the port forwarding policy. It is appreciated that embodiments may remove or reconfigure port forwarding policies at various times.

In some embodiments, multiple port forwarding policies may be configured for multiple devices behind the NAT device. The multiple port forwarding policies may allow multiple devices behind the NAT device to be scanned or analyzed in parallel or in an overlapping manner.

At block 408, a request is sent to determine if the port is open. In some embodiments, the request sent is a TCP synchronise (SYN) probe (e.g., packet). The TCP SYN probe is used to determine if a particular port is open on the device behind the NAT device. The TCP SYN probe is sent to the NAT device which changes the destination IP address (e.g., 215.10.20.89) to the IP address of the device (e.g., 192.168.1.100) behind the NAT device. The TCP SYN probe may also confirms whether the port forwarding policy configuration was successful.

At block 410, a response is received from the device. The response is a response to the TCP SYN probe and may be a SYN/ACK if the port is open and RST if the port is closed. The response is sent from the device behind the NAT device to the NAT device. The NAT device then performs NAT, e.g., the source IP address is changed from 192.168.1.100 to 215.10.20.89. The NAT device then sends the response to the device that sent the request (e.g., network monitor device 102).

At block 412, the response is analyzed. The device receiving the response (e.g., network monitor 102) may access records of devices behind a NAT device and determine that the source IP address (e.g., 215.10.20.89) is associated with the IP address of the device (e.g., 192.168.1.100) behind the NAT device (e.g., based on the port forwarding configuration of the NAT device) and determines whether the port is open on the device behind the NAT device or not. If the response is SYN/ACK then the port is determined to be opened. If the response is RST, then the port is determined to be closed. In some embodiments, the blocks 408-410 may be repeated to scan multiple ports of a device behind a NAT device. For example, an Nmap scan may be performed of multiple ports, which may then be used for identification or classification of the device behind the NAT device. Based on the open, closed, and non-responsive ports, the services running on the device may be determined and the device may be identified or classified. Embodiments may thus maintain dynamic stateful NAT information on the device (e.g., network device monitor 102) performing the scanning.

At block 413, the result is stored. The result of the response analysis can be stored (e.g., in a data store, a database, a list, etc.) to be used for performing an action, visually depicted in a graphical user interface, etc., as described herein.

At block 414, an action may be performed based on the response. The action may include restricting network access of the device behind the NAT device (e.g., by configuring the NAT device to limit network access of the device behind the NAT device), a notification may be sent (e.g., indicating that a new device has been found, has a vulnerability, etc.), and the VLAN of the device behind the NAT device may be changed. The action may further include logging into the device behind the NAT device and gathering information, and performing administrative tasks (e.g., updating the software of the device, etc.).

At block 416, the port forwarding policy is changed. In some embodiments, the port forwarding policy may be dynamically changed to revert or remove the port forwarding policy that allowed communication with a device behind the NAT device.

At block 418, whether there are more devices is determined. If there are more devices to be scanned or analyzed, block 404 may be performed. If there are not more devices to be scanned or analyzed, block 402 may be performed (e.g., for another network segment).

Figure 5:
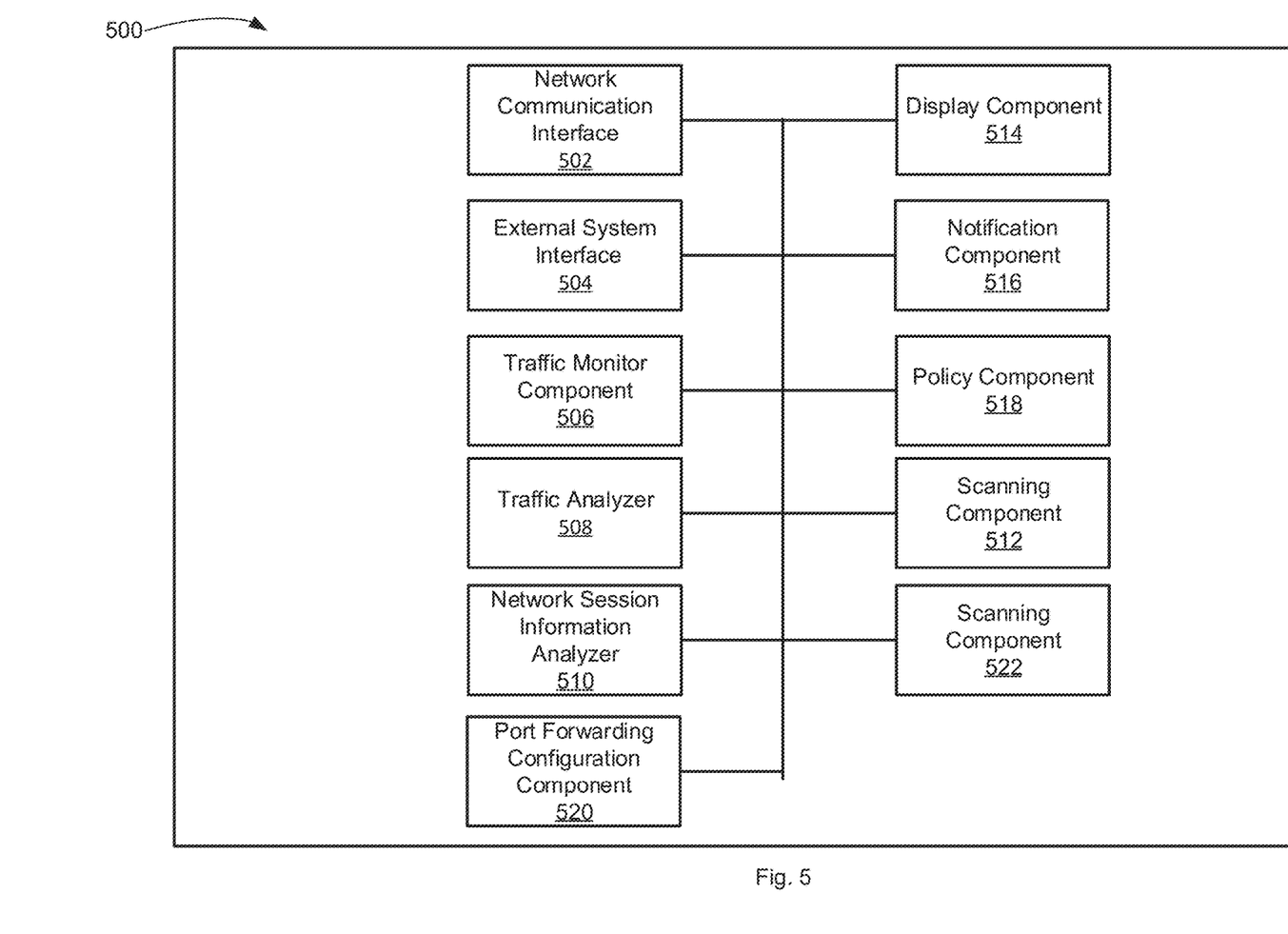
FIG. 5 depicts illustrative components of a system for device visibility and scanning in accordance with one implementation of the present disclosure.

FIG. 5 illustrates example components used by various embodiments. Although specific components are disclosed in system 500, it should be appreciated that such components are examples. That is, embodiments are well suited to having various other components or variations of the components recited in system 500. It is appreciated that the components in system 500 may operate with other components than those presented, and that not all of the components of system 500 may be required to achieve the goals of system 500.

FIG. 5 depicts illustrative components of a system for device visibility and scanning in accordance with one implementation of the present disclosure. Example system 500 includes a network communication interface 502, an external system interface 504, a traffic monitor component 506, a traffic analyzer 508, a network session information analyzer 510, a scanning component 512, a display component 514, a notification component 516, and a policy component 518, and a port forwarding configuration component 520. The components of system 500 may be part of a computing system or other electronic device (e.g., network monitor device 102) or a virtual machine and be operable to monitor and one or more devices communicatively coupled to a network. For example, the system 500 may further include a memory and a processing device, operatively coupled to the memory, which may perform the functions of or execute the components of system 500. The components of system 500 may access various data associated with a NAT device (e.g., network session information) and data associated with one or more devices behind the NAT device to have visibility of the devices behind the NAT device and scan the devices behind the NAT device. It is appreciated that the modular nature of system 500 may allow the components to be independent and allow flexibility to enable or disable individual components or to extend/upgrade components without affecting other components thereby providing scalability and extensibility. System 500 may perform one or more blocks of flow diagrams 300-400.

Communication interface 502 is operable to communicate with one or more devices (e.g., network device 104) coupled to a network that are coupled to system 500 and receive or access information about devices (e.g., network session information from a NAT device, etc.) coupled to the network, as described herein. The communication interface 502 may be operable to work with one or more components to initiate the communication with a NAT device to allow determination of the one or more devices behind a NAT device and scanning of the one or more NAT devices behind the NAT device.

External system interface 504 is operable to communicate with one or more third party, remote, or external systems to access information about a device to be identified or scanned including network session information. External system interface 504 may further store the accessed information in a data store. For example, external system interface 504 may access network session information from a firewall or router and store the accessed information in the data store. External system interface 504 may be operable to communicate with a vulnerability assessment (VA) system, an advanced threat detection (ATD) system, a mobile device management (MDM) system, a firewall (FW) system, a switch system, an access point (AP) system, etc. External system interface 504 may query a third party system using an API or CLI. For example, external system interface 504 may query a firewall for information (e.g., network session information) about a device or for a list of devices that are communicatively coupled to the firewall. In some embodiments, external system interface 504 may query a firewall or other system for information of communications associated with a device.

Traffic monitor component 506 is operable to monitor network traffic to determine if a device is a NAT device (e.g., using heuristics), as described herein. Traffic analyzer 508 is configured to perform analysis of network traffic (e.g., in real-time, with machine learning, etc.) to and from a device. Traffic analyzer 508 may have a packet engine operable to access packets of network traffic (e.g., passively) and analyze the network traffic. The traffic analyzer 508 may be configured to perform active or passive traffic analysis or a combination thereof. The traffic analyzer 508 may further be able to access and analyze traffic logs from one or more devices (e.g., network device 104, system 150, or aggregation device 106) or from a device being monitored. The traffic analyzer 508 may further be able to access traffic analysis data associated with a device being monitored, e.g., where the traffic analysis is performed by a third party system.

Network session information analyzer 510 is configured to analyze the network session information from a NAT device. Network session information analyzer 510 may analyze entries in the network session information that have been translated and determine one or more devices that are behind a NAT device, as described herein. Network session information analyzer 510 may further determine a unique identifier for device behind the NAT device, as described herein. Network session information analyzer 510 makes determinations to allow visibility of one or more devices that are behind a NAT device, as described herein. Network session information analyzer 510 may perform one or more blocks for flowchart 300.

Scanning component 512 is configured to scan one or more devices behind one or more NAT devices and analyze the results of the scan, as described herein. The scanning component may scan the ports of each device behind one or more NAT devices and provide results to policy component 518. Scanning component 512 may perform one or more blocks of flowchart 400.

Display component 514 is configured to optionally display a graphical user interface or other interface (e.g., command line interface) for depicting various devices behind one or more NAT devices, as described herein. In some embodiments, display component 512 may display a network graph for indicating one or more NAT devices and one or more devices behind the NAT devices.

Notification component 516 is operable to initiate one or more notifications based on the results of scanning one or more devices behind a NAT device, as described herein. The notification may be any of a variety of notifications, e.g., IT ticket, email, SMS, a HTTP notification, etc., as described herein.

Policy component 518 is operable for initiating or triggering one or more remediation actions or security actions, as described herein. Policy component 518 may further be configured to perform other functions including checking compliance status, finding open ports, etc. Policy component 518 may restrict network access, signal a patch system or service (e.g., software update component 512), signal an update system or service (e.g., software update component 512), etc., as described herein. The policy component 518 may thus, among other things, invoke automatically patching, automatically updating, and automatically restrict network access of a device (e.g., that has out-of-date software).

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

Port forwarding configuration component 520 is operable to determine a port forwarding configuration to be configured on a NAT device to enable communication with a device behind the NAT device, as described herein. Port forwarding configuration component 520 is further operable to communicate the port forwarding configuration to configure the NAT device, as described herein. Port forwarding configuration component 520 may also change or remove a port forwarding configuration on a NAT device after a scan or other analysis has been performed on a device behind the NAT device. Port forwarding configuration component 520 may configure the NAT device for serial or parallel scanning of devices behind a NAT device, as described herein.

The system 500 may be software stored on a non-transitory computer readable medium having instructions encoded thereon that, when executed by a processing device, cause the processing device to select a first device, communicatively coupled to a network, based on a the first device performing network address translation (NAT). The first device is communicatively coupled to a second device and the second device is configured to communicate through the first device. The instructions may further cause the processing device to access network session information associated with the first device, where the network session information comprises an address associated with the second device. The instructions may further cause the processing device to determine a unique identifier associated with the second device based on the network session information and configure a port forwarding policy on the first device based on the network session information. The instructions may further cause the processing device to perform a scan of the second device based on the port forwarding policy and store the results of the scan.

In some embodiments, the instructions further cause the processing device to perform an action based on the scan. In various embodiments, the instructions further cause the processing device to remove the port forwarding policy on the first device. In some embodiments, the first device is at least one of a router, a firewall, a switch, and a carrier grade (CG) NAT device. In various embodiments, the port forwarding policy of the first device is configured using an application programming interface (API). In some embodiments, the processing device further to determine an operating system (OS) of the second device based on the network session information. In various embodiments, the unique identifier of the second device comprises an IP address associated with the second device and an IP address associated with the first device. In some embodiments, the unique identifier of the second device further comprises a media access control (MAC) address associated with the first device.

Figure 6:
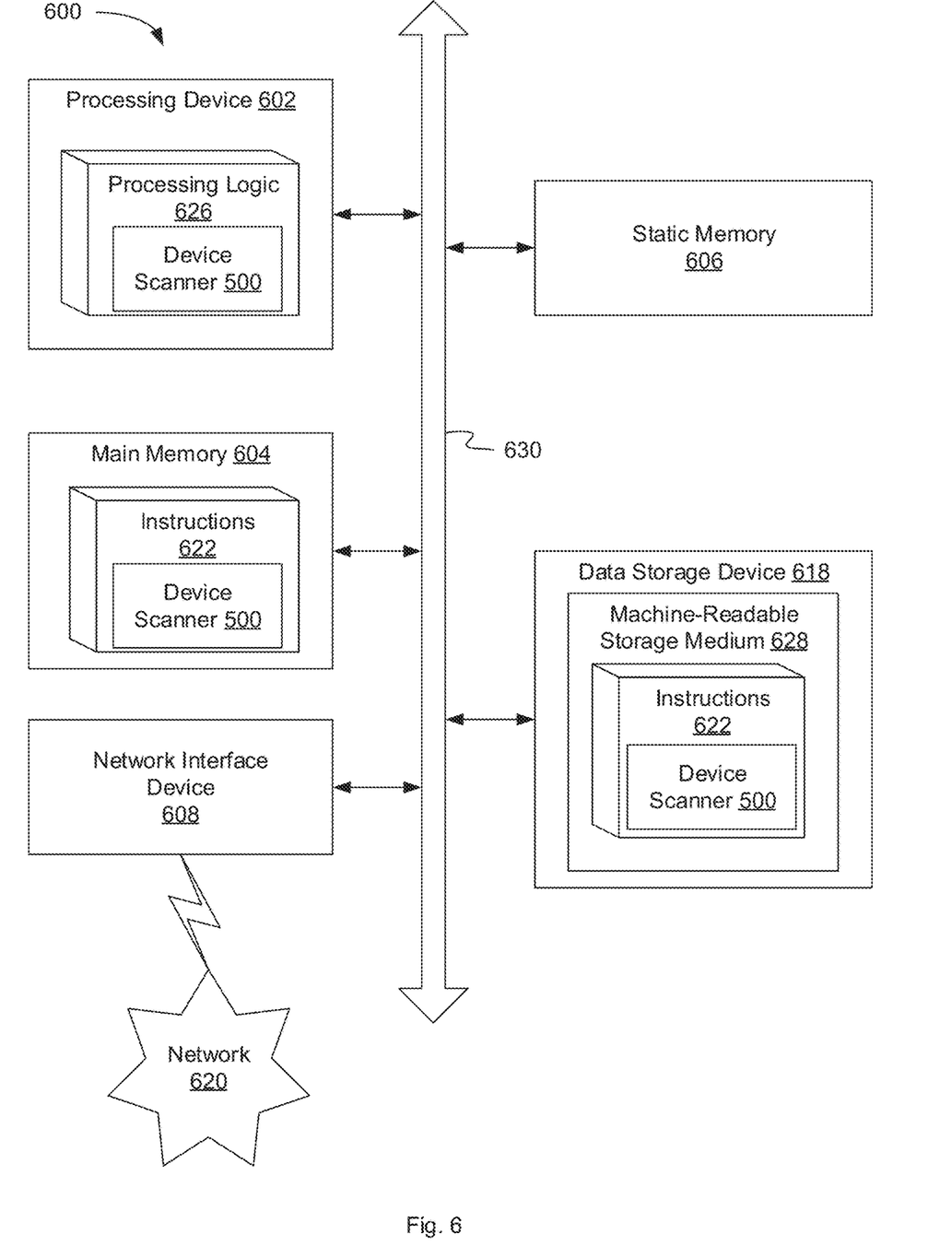
FIG. 6 is a block diagram illustrating an example computer system, in accordance with one implementation of the present disclosure.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as network monitor device 102 configured to determine one or more devices behind a NAT device and perform a scan of the one or more devices behind the NAT device.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of system 500 shown in FIG. 5, for performing the operations and steps discussed herein.

The data storage device 618 may include a machine-readable storage medium 628, on which is stored one or more set of instructions 622 (e.g., software) embodying any one or more of the methodologies of functions described herein, including instructions to cause the processing device 602 to execute device scanner 500. The instructions 622 may also reside, completely or at least partially, within the main memory 604 or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for determination of one or more devices behind a NAT device and scanning of the one or more devices behind a NAT device, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
    selecting a first device, communicatively coupled to a network, based on the first device performing network address translation (NAT), wherein the first device is communicatively coupled to a second device, and wherein the second device is configured to communicate through the first device;
    accessing network session information associated with the first device, wherein the network session information comprises an address associated with the second device;
    determining, with a processing device, an identifier associated with the second device based on the network session information;
    configuring a port forwarding policy on the first device based on the network session information;
    performing a scan of the second device based on the port forwarding policy; and
    storing the results of the scan.

2. The method of claim 1 further comprising:
    performing an action based on the scan.

3. The method of claim 1 further comprising:
    removing the port forwarding policy on the first device.

4. The method of claim 1, wherein the second device is a NAT device, further comprising:
    accessing network session information associated with the second device, wherein the network session information comprises an address associated with a third device;
    determining, with the processing device, an identifier associated with the third device based on the network session information;
    configuring a port forwarding policy on the second device based on the network session information associated with the second device;
    performing a scan of the third device based on the port forwarding policy; and
    storing the results of the scan.

5. The method of claim 1, wherein the first device is at least one of a router, a firewall, a switch, or a carrier grade (CG) NAT device.

6. The method of claim 1, wherein the port forwarding policy of the first device is configured using at least one of an application programming interface (API), command line interface (CLI), or a simple network management protocol (SNMP) interface.

7. The method of claim 1 further comprising:
    determining an operating system (OS) of the second device based on the network session information.

8. The method of claim 1, wherein the identifier of the second device comprises a unique identifier comprising an IP address associated with the second device and an IP address associated with the first device.

9. The method of claim 8, wherein the unique identifier of the second device further comprises a media access control (MAC) address associated with the first device.

10. A system comprising:
    a memory; and
    a processing device, operatively coupled to the memory, to:
        select a first device, communicatively coupled to a network, based on the first device performing network address translation (NAT), wherein the first device is communicatively coupled to a second device, and wherein the second device is configured to communicate through the first device;
        access network session information associated with the first device, wherein the network session information comprises an address associated with the second device;
        determine an identifier associated with the second device based on the network session information;
        configure a port forwarding policy on the first device based on the network session information;
        perform a scan of the second device based on the port forwarding policy; and
        store the results of the scan.

11. The system of claim 10, wherein the processing device further to perform an action based on the scan.

12. The system of claim 10, wherein the processing device further to remove the port forwarding policy on the first device.

13. The system of claim 11, wherein the first device is at least one of a router, a firewall, a switch, or a carrier grade (CG) NAT device.

14. The system of claim 11, wherein the port forwarding policy of the first device is configured using an application programming interface (API).

15. The system of claim 10, wherein the processing device further to determine an operating system (OS) of the second device based on the network session information.

16. The system of claim 10, wherein the identifier of the second device comprises a unique identifier comprising an IP address associated with the second device and an IP address associated with the first device.

17. The system of claim 10, wherein the unique identifier of the second device further comprises a media access control (MAC) address associated with the first device.

18. A non-transitory computer readable medium having instructions encoded thereon that, when executed by a processing device, cause the processing device to:
    select a first device, communicatively coupled to a network, based on the first device performing network address translation (NAT), wherein the first device is communicatively coupled to a second device, and wherein the second device is configured to communicate through the first device;
    access network session information associated with the first device, wherein the network session information comprises an address associated with the second device;
    determine a unique identifier associated with the second device based on the network session information;
    configure a port forwarding policy on the first device based on the network session information;
    perform a scan of the second device based on the port forwarding policy; and
    store the results of the scan.

19. The non-transitory computer readable medium of claim 18, wherein the instructions further cause the processing device to perform an action based on the scan.

20. The non-transitory computer readable medium of claim 18, wherein the instructions further cause the processing device to remove the port forwarding policy on the first device.

21. The non-transitory computer readable medium of claim 18, wherein the first device is at least one of a router, a firewall, a switch, or a carrier grade (CG) NAT device.

* * * * *